(12) United States Patent
Nishi et al.

(10) Patent No.: US 10,520,605 B2
(45) Date of Patent: Dec. 31, 2019

(54) SATELLITE SIGNAL RECEPTION CHARACTERISTIC ESTIMATION APPARATUS, METHOD THEREOF, AND PROGRAM THEREOF

(71) Applicant: NIPPON TELEGRAPH AND TELEPHONE CORPORATION, Tokyo (JP)

(72) Inventors: Keisuke Nishi, Tokyo (JP); Youichi Fukada, Tokyo (JP); Akihiro Morita, Tokyo (JP); Seiji Yoshida, Tokyo (JP); Takashi Hirose, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 228 days.

(21) Appl. No.: 15/547,706

(22) PCT Filed: Feb. 12, 2016

(86) PCT No.: PCT/JP2016/054100
§ 371 (c)(1),
(2) Date: Jul. 31, 2017

(87) PCT Pub. No.: WO2016/129667
PCT Pub. Date: Aug. 18, 2016

(65) Prior Publication Data
US 2018/0024250 A1 Jan. 25, 2018

(30) Foreign Application Priority Data

Feb. 13, 2015 (JP) ................................. 2015-026138
Jul. 10, 2015 (JP) ................................. 2015-138536

(51) Int. Cl.
*G01S 19/23* (2010.01)
*H04B 7/185* (2006.01)

(52) U.S. Cl.
CPC .............. *G01S 19/23* (2013.01); *H04B 7/185* (2013.01)

(58) Field of Classification Search
CPC .......... G01S 19/23; G01S 19/48; H04B 7/185
(Continued)

(56) References Cited

U.S. PATENT DOCUMENTS

2012/0007982 A1* 1/2012 Giuffrida ............... G01C 11/02
348/144
2013/0135146 A1* 5/2013 Ransom .................. G01S 19/23
342/357.36

FOREIGN PATENT DOCUMENTS

JP H10-197246 A 7/1998
JP 2007-274354 A 10/2007

OTHER PUBLICATIONS

Renata Pelc-Mieczkowska, "Primary results of using hemispherical photography for advanced GPS mission planning," Jan. 2014, 9th international conference environemental engineering, Procedia Engineering, pp. 1-8 (Year: 2014).*

(Continued)

*Primary Examiner* — Bo Fan
(74) *Attorney, Agent, or Firm* — Harness, Dickey & Pierce, P.L.C.

(57) ABSTRACT

A satellite signal reception characteristic estimation apparatus includes a satellite orbital information collection unit that collects and outputs orbital information for a satellite; a peripheral environment spatial information collection unit that collects spatial information for a peripheral environment of an installation position of a satellite antenna; a positional information collection unit that collects and outputs positional information for the installation position of the satellite antenna; and a simulation server unit that estimates reception characteristics of satellite signals at the installation position of the satellite antenna by performing a simulation (Continued)

based on the orbital information, the spatial information, and the positional information outputted from the satellite orbital information collection unit, the peripheral environment spatial information collection unit, and the positional information collection unit.

7 Claims, 13 Drawing Sheets

(58) Field of Classification Search
USPC .................. 342/357.42, 357.36, 417, 465
See application file for complete search history.

(56) References Cited

OTHER PUBLICATIONS

Tomohiro Hakamata et al., "3-jigen chizu wo mochiita GNSS yuuyousei hyouka simulation system no kairyou" [Improvement of GNSS Usability Evaluation Simulation System Using 3D map], The Geoinformation Forum Japan 2003, The University of Tokyo/ Center for Spatial Information Science/Student Forum, Jun. 11, 2003.

Tomohiro Hakamata, "Kaisetsu to hansha wo kouryo shita toshi-nai sokui kankyou simulation system" [Urban Positioning Environment Simulation System Considering Diffraction and Reflection], 10th Research Forum on Social Infrastructure for Advanced Positioning, Mar. 26, 2004.

Keisuke Nishi et al., "Proposals of a Receiving Characteristics Estimation Method for Satellite Signal and an Efficient Installation Technique for GPS Receivers", Proceedings of the 2015 IEICE General Conference Tsushin 2, Feb. 14, 2015, p. 311.

Renata Pelc-Mieczkowska, "Primary results of using hemispherical photography for advanced GPS mission planning," The 9th International Conference "Environmental Engineering" [online], 2014, [retrieved on Mar. 17, 2016].

International Search Report for PCT/JP2016/054100, ISA/JP, dated Mar. 29, 2016 with attached translation thereof.

* cited by examiner

SATELLITE SIGNAL RECEPTION CHARACTERISTIC ESTIMATION APPARATUS, METHOD THEREOF, AND PROGRAM THEREOF

CROSS-REFERENCE TO RELATED APPLICATIONS

This application is a 371 U.S. National Stage of International Application No. PCT/JP2016/054100, filed Feb. 12, 2016, which claims the benefit of and priority to Japanese Patent Application No. 2015-026138, filed Feb. 13, 2015, and Japanese Patent Application No. 2015-138536, filed Jul. 10, 2015, the contents of which are incorporated herein by reference.

TECHNICAL FIELD

The present invention relates to a satellite signal reception characteristic estimation apparatus, a method thereof, and a program thereof. In particular, the present invention relates to technology for estimating reception characteristics from environmental information when installing a satellite antenna.

BACKGROUND ART

As means for achieving high-precision time (phase) synchronization between base stations, which is necessary in time division duplex (TDD) mobile communication systems, the use of global navigation satellite systems (GNSS) such as GPS (Global Positioning System) is growing. Navigation satellites in global navigation satellite systems carry high-precision clocks that are synchronized to Coordinated Universal Time (UTC), and radio-transmit navigation satellite signals that are synchronized therewith, and it is possible to synchronize the time to UTC by receiving these navigation satellite signals at any geographical point on earth.

Because there is a propagation delay until the navigation satellite signals (hereinafter referred to as satellite signals) from a satellite reach the reception point, in order to correct for the delay time, satellite signals from at least four satellites must be received simultaneously to identify four parameters (x, y, z, t) including the three-dimensional coordinate information (x, y, z) for the reception position of the satellite signals, and reception time information (t). In the case of GPS, there are currently thirty or more navigation satellites (hereinafter referred to as satellites) that orbit the earth on six semi-synchronous orbits (satellite orbits having revolution periods of half a sidereal day) having periods of approximately 12 hours, but in order to achieve constant positioning and time synchronization, it is necessary to choose an environment in which at least four satellites can always be captured.

Conventionally, the environmental conditions when installing navigation satellite antennas (hereinafter referred to as satellite antennas) have, for example, included conditions such as (a) that an open space of at least a certain elevation angle with respect to the horizontal plane is ensured at the satellite antenna installation position, (b) that there are no obstacles on the south side of the satellite antenna, (c) that there are no obstacles that reflect the radio waves of satellite signals near the satellite antenna, and (d) that there are no wireless communication devices in the vicinity of the satellite antenna that output wireless signals near the frequencies of the radio waves of the satellite signals. Satellite antenna installation positions were determined in accordance with these conditions, primarily on the basis of human confirmation work.

Furthermore, since the celestial positions of satellites change over time, it was necessary to provisionally install a satellite antenna on the basis of the above-mentioned environmental conditions, and then to monitor the satellite signal reception characteristics for a certain period of time (normally about one day), in order to confirm that the necessary number of satellite signals can constantly be captured.

If, as a result of monitoring the satellite signal reception characteristics in this way, the reception characteristics are poor, the satellite antenna installation position must then be determined once again, and such satellite antenna installation work procedures that are based on trial-and-error methodologies can not only lead to work delays, but can also cause reduced work efficiency and increased work costs. For this reason, reductions in the time required for optimal position determination and improvements in work efficiency in the installation of satellite antennas have been sought.

As a solution therefor, there is a method of estimating the satellite signal reception characteristics at the coordinates of a planned installation position by means of a simulation carried out beforehand, when installing a satellite antenna. As conventional art relating to methods for simulating satellite signal reception characteristics, systems in which the satellite signal reception characteristics are estimated by considering the influence of structures that can be obstacles to the reception of satellite signals have been proposed (see Non-Patent Documents 1 and 2).

These systems involve performing an analysis of the reception characteristics of satellite signals based on the following three models.

(1) Satellite orbit model: Estimating the position of a satellite by calculating the satellite orbit based on a Kepler orbit model using publicly available Keplerian orbital elements of the satellite.

(2) Signal propagation model: Estimating a radio wave propagation model of the satellite signals by considering the influence of direct waves, diffracted waves, and reflected waves of the radio waves from a satellite.

(3) Three-dimensional map model: Estimating, from three-dimensional map data, the reflection paths of satellite signals from non-line-of-sight (NLOS) satellites that cannot be directly viewed, and estimating a pseudorange error value.

From these models, it is considered to be possible to estimate the number of line-of-sight (LOS) satellites that can be directly viewed from any geographical point on a map, the area in which satellite positioning can be used, and the PDOP (position dilution of precision) value, which is position error information for the positioning.

PRIOR ART DOCUMENTS

Non-Patent Documents

Non-Patent Document 1: Tomohiro HAKAMATA, Yusuke KONISHI, Yongcheol SUH, Ryosuke SHIBASAKI, "3-jigen chizu wo mochiita GNSS yuuyousei hyouka simulation system no kairyou" [Improvement of GNSS Usability Evaluation Simulation System Using 3D map], The Geoinformation Forum Japan 2003, The University of Tokyo/Center for Spatial Information Science/Student Forum, Jun. 11, 2003

Non-Patent Document 2: Tomohiro HAKAMATA, "Kaisetsu to hansha wo kouryo shita toshi-nai sokui kankyou simulation system" [Urban Positioning Environment Simulation System Considering Diffraction and Reflection], 10th Research Forum on Social Infrastructure for Advanced Positioning, Mar. 26, 2004

SUMMARY OF INVENTION

Problem to be Solved by Invention

The problems of conventional satellite signal reception characteristic estimation methods based on 3D map data include the following:

(1) Problem of accounting for the influence of reception obstacles near the satellite antenna installation site: It is difficult to estimate (simulate) satellite signal reception characteristics that accurately account for the environment in the periphery of a satellite antenna because it is not possible to analyze the influence of reception obstacles to satellite signals (built structures such as walls, columns and fences, trees, and the like) that are present near the satellite antenna installation position but that cannot be read from 3D map data.

(2) Problem of obtaining real-time information: If the 3D map data are not updated in real-time, there is a possibility of errors occurring in the estimation results due to inconsistencies with the actual environment.

The present invention was made in view of the above-mentioned problems, and has the purpose of determining a satellite antenna installation position that is suitable for receiving satellite signals from navigation satellites, in a short time, using a simple procedure. More specifically, the present invention has the purpose of raising the precision when optimizing the installation position of a satellite antenna, and achieving improved work efficiency by simplifying the satellite antenna installation procedure, by collecting, in real-time, spatial information for the peripheral environment of a planned satellite antenna installation position, which was not able to be taken into account in conventional simulations using 3D map data, and analyzing the influence thereof on the satellite signal reception characteristics.

Means for Solving the Problems

In order to solve the aforementioned problems, the present invention proposes a satellite signal reception characteristic estimation apparatus for estimating reception characteristics of satellite signals from a satellite in order to install a satellite antenna at an optimal position, the satellite signal reception characteristic estimation apparatus including:

a satellite orbital information collection unit that collects and outputs orbital information for the satellites;

a peripheral environment spatial information collection unit that collects and outputs spatial information for a peripheral environment of an installation position of the satellite antenna;

a positional information collection unit that collects and outputs positional information for the installation position of the satellite antenna; and a simulation unit that estimates the reception characteristics of the satellite signals at the installation position of the satellite antenna by performing a simulation based on the orbital information, the spatial information, and the positional information outputted from the satellite orbital information collection unit, the peripheral environment spatial information collection unit, and the positional information collection unit.

Additionally, in order to solve the aforementioned problems, the present invention proposes a satellite signal reception characteristic estimation method for estimating reception characteristics of satellite signals from a satellite in order to install a satellite antenna at an optimal position, the satellite signal reception characteristic estimation method including:

a first step of provisionally determining an installation position of the satellite antenna;

a second step of collecting spatial information for a peripheral environment of the provisionally determined installation position of the satellite antenna;

a third step of estimating the reception characteristics of the satellite signals at the installation position of the satellite antenna; and a fourth step of determining, from the results of the estimation of the reception characteristics, whether or not the installation position of the satellite antenna is suitable for installation of the satellite antenna, and if the installation position of the satellite antenna is not suitable for installation of the satellite antenna, then returning to the first step.

The satellites to which the present invention is applied may be navigation satellites, or may be other types of satellites.

Advantageous Effects of the Invention

According to the present invention, it is possible to instantly analyze the influence that obstacles present in the periphery of a planned satellite antenna installation position will have on the satellite signal reception characteristics, and to determine, with high precision, the satellite antenna installation positions that are optimal for satellite signal reception using a simple procedure, thereby achieving improved efficiency by reducing the time required for satellite antenna installation work.

Additionally, the following advantageous effects are obtained by the present invention.

The precision of optimization of satellite antenna installation positions can be improved by estimating multipath from spatial information for the periphery of a planned satellite antenna installation position obtained from 3D laser measurements or 3D image data of the peripheral environment of the planned satellite antenna installation position captured by a 3D imaging camera, and simulating the influence of multipath on the satellite signal reception characteristics.

Recommended satellite antenna installation positions can be shown by simulating the satellite signal reception characteristics when the coordinates of the satellite antenna installation position are moved, using the same spatial information for the periphery of the planned satellite antenna installation position, thereby further improving the work efficiency for satellite antenna installation.

The optimization of the satellite antenna installation position can be made easier by accounting for the error in the positional information for a planned satellite antenna installation position in the error in the analysis results for satellite signal reception characteristics.

The maintenance and operation properties and the reliability can be improved by continuously monitoring the peripheral environment of a satellite antenna installation position during the operation of the satellite antenna.

MODES FOR CARRYING OUT THE INVENTION

The present invention relates to a technology that estimates an optimal installation position in a short time using a simple procedure, by collecting spatial information for the peripheral environment which was not able to be taken into account in conventional simulations using 3D map data, estimating, on the basis thereof, satellite signal reception characteristics at a planned satellite antenna installation position, and determining whether or not the planned installation position is suitable for the reception of satellite signals.

Figure 1:
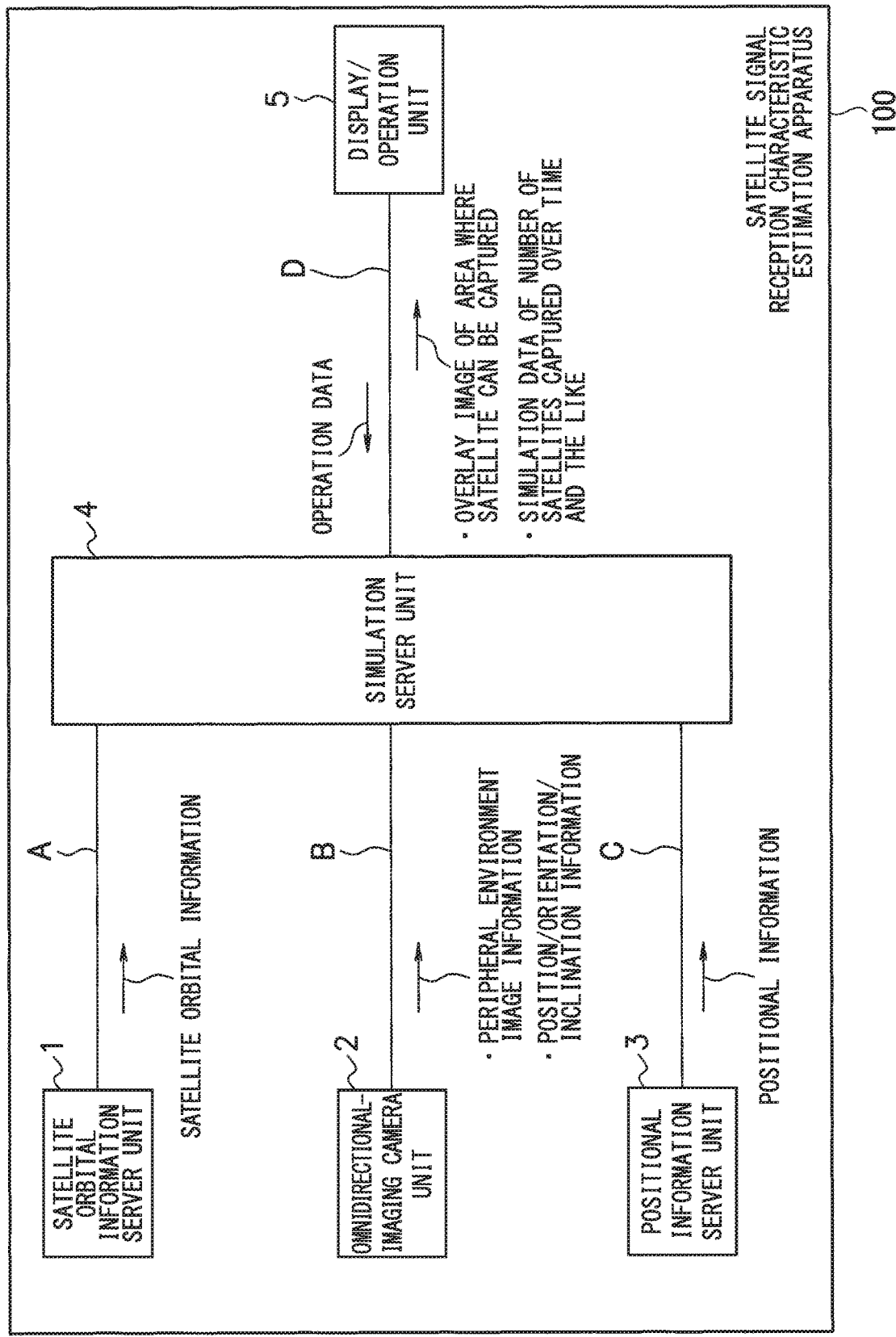
FIG. 1 is a basic block diagram illustrating a satellite signal reception characteristic estimation apparatus according to an embodiment of the present invention.
Figure 2:
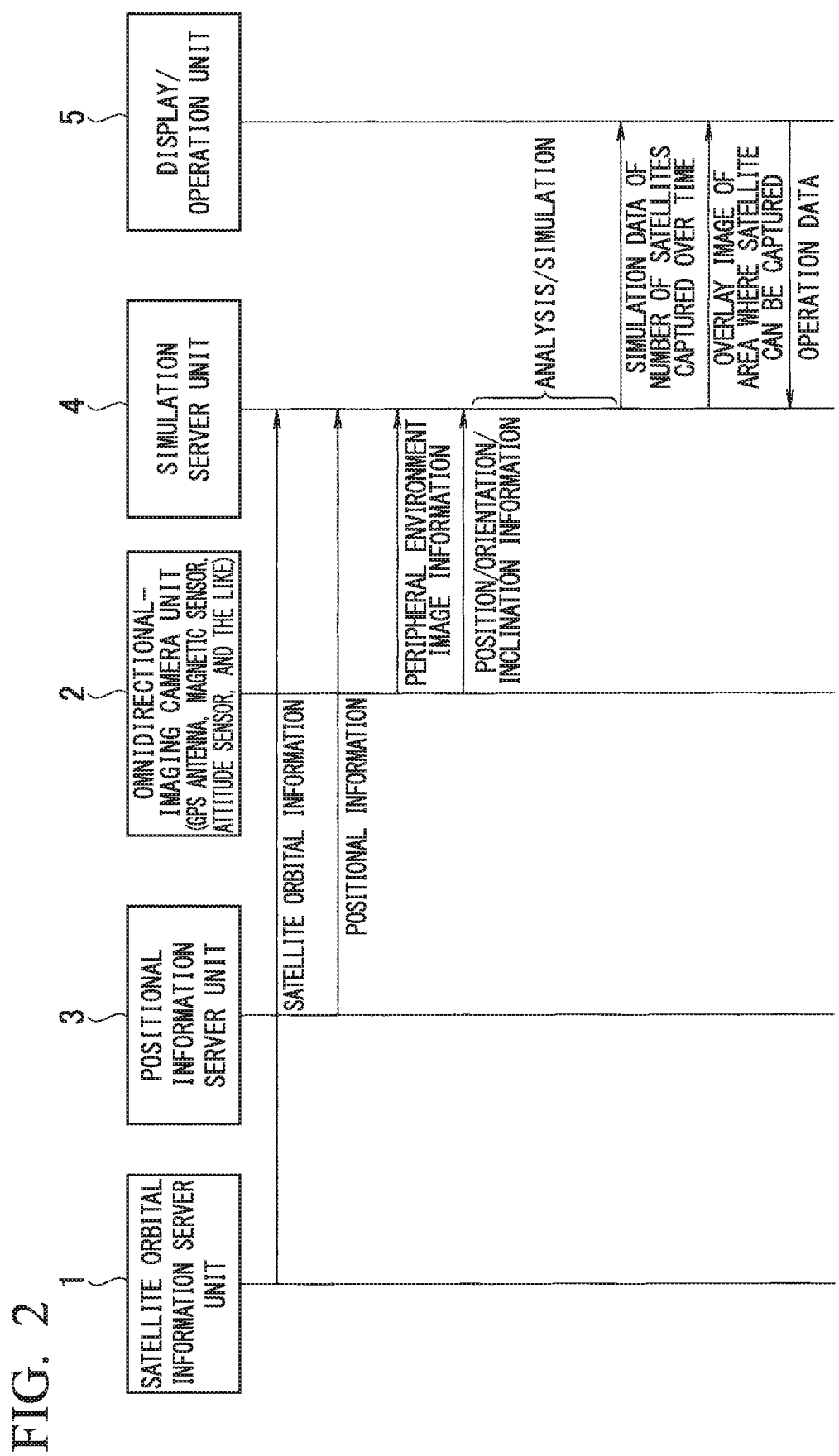
FIG. 2 is a sequence diagram illustrating the basic operations of a satellite signal reception characteristic estimation apparatus according to an embodiment of the present invention.

The basic structure and the sequence of basic operations in a satellite signal reception characteristic estimation apparatus 100 according to an embodiment of the present invention are explained in detail, in FIG. 1 and FIG. 2 respectively.

The satellite signal reception characteristic estimation apparatus 100 according to an embodiment of the present invention includes a satellite orbital information server unit (satellite orbital information collection unit) 1, an omnidirectional-imaging camera unit (peripheral environment spatial information collection unit) 2, a positional information server unit (positional information collection unit) 3, a simulation server unit (simulation unit) 4, and a display/operation unit 5.

The satellite orbital information server unit 1 collects information (satellite orbital information) relating to satellite orbits and supplies this information to the simulation server unit 4. The omnidirectional-imaging camera unit 2 captures images of the peripheral environment of a position planned for installation of a satellite antenna, collects the image information as spatial information (peripheral environment image information), and supplies this spatial information to the simulation server unit 4. The positional information server unit 3 collects positional information for the position planned for installation of the satellite antenna and supplies this positional information to the simulation server unit 4. The simulation server unit 4 performs an analysis of satellite signal reception characteristics at the position planned for installation of the satellite antenna on the basis of the information supplied from the satellite orbital information server unit 1, the omnidirectional-imaging camera unit 2, and the positional information server unit 3. The display/operation unit 5 displays the captured image information and the analysis results of the satellite signal reception characteristics, and mediates operations performed by a worker.

The satellite orbital information server unit 1, the omnidirectional-imaging camera unit 2, the positional information server unit 3, and the display/operation unit 5 are respectively connected to the simulation server unit 4 by means of data transmission/reception media A to D, and transmit/receive data (information) between each other. As the data transmission/reception media A to D, it is possible to contemplate the use of a wired communication medium such as Ethernet (registered trademark) or the like, a wireless communication medium such as mobile communications, a wireless LAN (Local Area Network) or the like, or other information transfer media such as an external memory, or the like. Additionally, the constituent units illustrated in FIG. 1 may all be provided at the same location, or a portion may be provided at a separate location, and the constituent units connected via a WAN (Wide Area Network) or the like, and the data transmission and reception may be performed in a remote environment.

The satellite orbital information server unit 1 supplies the simulation server unit 4 with pre-collected satellite orbital information, i.e., information regarding the position of a satellite at an arbitrary time. As the satellite orbital information, it is possible to contemplate the use of almanac data, ephemeris data or the like. Almanac data and ephemeris data for satellites are publicly available through governmental organizations such as the USCG (United States Coast Guard Navigation Center (URL: http://www.navcen.uscg.gov)) in the United States and JAXA (Japan Aerospace eXploration Agency (URL: http://qz-vision.jaxa.jp/USE/)). Additionally, satellite orbital information can also be obtained from satellite signals.

The satellite orbital information server unit 1 continually collects such published data for satellite orbital information, and updates the satellite orbital information. The satellite orbital information is supplied to the simulation server unit 4 via the data transmission/reception medium A, converted to satellite orbital information on a celestial sphere centered at the planned position for installation of a satellite antenna by the simulation server unit 4 on the basis of the published orbital information, and used for analyzing the satellite signal reception characteristics.

The omnidirectional-imaging camera unit 2 is provisionally installed at the position planned for installation of the satellite antenna, and captures omnidirectional image information of the peripheral environment. The omnidirectional-imaging camera unit 2 may include a plurality of cameras between which the spatial regions to be imaged are divided, or may use a fish-eye lens or the like that can capture images from all directions at once. Additionally, it is possible to use a 3D camera as mentioned below.

The image information of the peripheral environment captured by the omnidirectional-imaging camera unit 2 is supplied to the simulation server unit 4 via the data transmission/reception medium B. While the image information of the peripheral environment is projected onto the coordinates of a celestial sphere centered at the installation position of the omnidirectional-imaging camera unit 2 in the simulation server unit 4, the physical orientation and inclination may be adjusted when installing the omnidirectional-imaging camera unit 2. Alternatively, a magnetic sensor, attitude sensor, or the like may be mounted on the omnidirectional-imaging camera unit 2, and orientation and inclination information for the omnidirectional-imaging camera unit 2 may be supplied to the simulation server unit 4 together with the captured image information of the peripheral environment, and the orientation and inclination may be adjusted during the process of projecting the image information of the peripheral environment on the celestial sphere in the simulation server unit 4. In other words, the mapping of the information onto the coordinates of the celestial sphere may be corrected.

Additionally, the orientation and inclination may be corrected by collating the image information of the peripheral environment with 3D map data in the simulation server unit 4. Aside therefrom, the orientation and inclination can be corrected by using actual measurement data for the satellite signal reception characteristics.

By using a 3D camera as the omnidirectional-imaging camera unit 2, it is possible to collect spatial 3D information surrounding the planned position for installation of the satellite antenna. Additionally, a 3D laser measurer can also be used in order to obtain more detailed spatial information.

Additionally, in some cases, a GPS receiver may be mounted on the omnidirectional-imaging camera unit 2, and in such cases, the positional information obtained from the positioning information received by the GPS receiver is supplied to the simulation server unit 4 via the data transmission/reception medium B instead of the positional information server unit 3 (in this case, the omnidirectional-imaging camera unit 2 includes both the peripheral environment spatial information collection unit and the positional information collection unit recited in the claims).

The positional information server unit 3 collects information on the planned position for installation of the satellite antenna, i.e., the position of installation of the omnidirectional-imaging camera unit 2 in, the form of 3D coordinate information, and supplies this positional information to the simulation server unit 4 via the data transmission/reception medium C. Methods for generating positional information include a method of positioning by receiving satellite signals at the planned position for installation of the satellite antenna, a method of generating positional information from a map database by designating a geographical point on a map, a method of generating positional information from address and floor information, and a method of inputting the positional information in the form of coordinates.

The simulation server unit 4 performs simulations to estimate the satellite signal reception characteristics at the position of installation of the omnidirectional-imaging camera unit 2, based on the data supplied from the satellite orbital information server unit 1, the omnidirectional-imaging camera unit 2, and the positional information server unit 3. The detailed operations thereof are described below.

The simulation server unit 4 supplies to the display/operation unit 5, via the data transmission/reception medium D, simulation results regarding the number of satellites that can be captured over time and information relating to the open area on the celestial sphere in which satellite signals can always be captured, estimated from the simulations and the captured image information of the peripheral environment, as well as information on the orbits of satellites on the celestial sphere centered at the planned satellite antenna installation position, and the like.

The display/operation unit 5 displays the images of the peripheral environment captured by the omnidirectional-imaging camera unit 2 received from the simulation server unit 4, images having, overlaid thereon, the orbits of satellites or the area that needs to be opened (satellite-observable area overlay images), simulation data regarding the number of satellites that are captured over time, and the like. The display/operation unit 5 also transmits operation data to the simulation server unit 4, so as to provide instructions for various operations such as the running of simulations or changing of the image display position.

Figure 3:
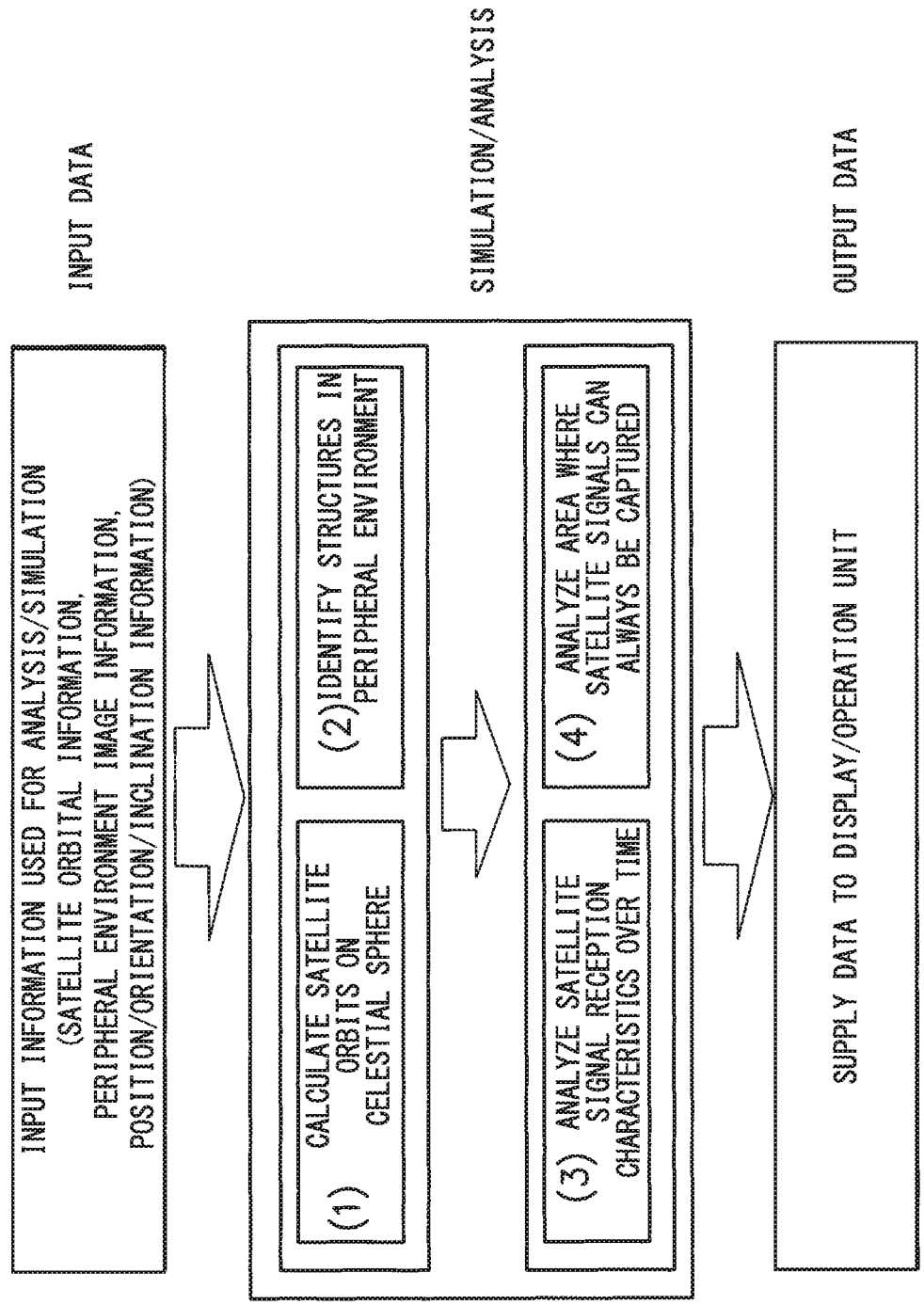
FIG. 3 is a flow chart illustrating the operations in a simulation server unit.

Next, the operations of the simulation server unit 4 will be explained with reference to FIG. 3.

The simulation server unit 4 uses the satellite orbital information supplied from the satellite orbital information server unit 1, the peripheral environment image information and the orientation and inclination information for the omnidirectional-imaging camera unit 2 supplied from the omnidirectional-imaging camera unit 2, and the positional information for the omnidirectional-imaging camera unit 2 supplied from the positional information server unit 3 to perform the following calculations and analyses.

(1) Calculation of Satellite Orbits on Celestial Sphere

Satellite orbits are determined by orbital elements based on Kepler's laws. The orbital elements include the epoch, the mean motion, the eccentricity, the orbital inclination, the right ascension of the ascending node, the argument of the perigee, and the mean anomaly. The simulation server unit 4 calculates satellite orbits drawn on the coordinates of a celestial sphere centered at the installation point of the omnidirectional-imaging camera unit 2 on the basis of the satellite orbital information for satellites supplied from the satellite orbital information server unit 1 and the positional information of the omnidirectional-imaging camera unit 2 supplied from the positional information server unit 3. Once calculated, the orbital data may be saved in a database, not shown.

(2) Identification of Structures in Peripheral Environment

From image information of the peripheral environment at the point planned for installation of the satellite antenna, captured by the omnidirectional-imaging camera unit 2, structures that pose obstacles to the reception of satellite signals and open space having a direct view of satellite signals are identified. Methods for identifying structures and open space include identification by differences in the tone of image information of the peripheral environment of the omnidirectional-imaging camera unit 2, identification by designating areas of open space or structures by manual operation, and identification by estimating the position of structures based on information such as 3D map data and information on the position, orientation, and inclination of the omnidirectional-imaging camera unit 2.

(3) Analysis of Satellite Signal Reception Characteristics Over Time

From the satellite orbital information for satellites on the celestial sphere centered at the planned satellite antenna installation position and the results of structure identification in the image information for the peripheral environment at the planned satellite antenna installation position, it is determined whether or not, at a certain time, a satellite signal is in a visible state not blocked by obstacles in the periphery of the satellite antenna, i.e., whether or not the satellite signal is in an LOS (Line of Sight) state, thereby primarily estimating the satellite signal reception characteristics at that time, i.e., whether or not it is possible to receive the satellite signal well and in an LOS state.

As the specific estimation method, it is determined that a satellite is not in an LOS state if there is an overlap between the positions of a structure projected onto the celestial sphere centered at the planned satellite antenna installation position and the position of the satellite projected onto the celestial sphere. Additionally, the state of overlap between the positions of structures and satellites may be determined on a so-called sky map in which information on the celestial sphere is projected onto a 2D plane. In that case, the projection onto the 2D plane is performed by appropriately converting the satellite orbit in accordance with the projection method that was used when capturing the images of the peripheral environment. For example, when capturing a sky map image using a fish-eye lens, projection methods such as stereographic projection and equidistant projection may be used. The satellite signal reception characteristics over time are estimated by performing analyses using the same procedure for the positions of a satellite at different points in time on the basis of the satellite orbital information of the satellite.

In order to simulate the satellite signal reception characteristics in more detail, as mentioned below, it is possible to use 3D image information of the peripheral environment captured by the omnidirectional-imaging camera unit 2 or 3D spatial information measured by a 3D laser measurer to estimate multipath caused by structures in the periphery of the satellite antenna, based on a radio wave propagation model of diffracted waves and reflected waves, and to estimate the influence of the superimposition of multipath signals onto the satellite signals in an LOS state or to analyze the influence of satellite signals in an NLOS (Non-Line-of-Sight) state, thereby improving the precision of the simulation of satellite signal reception characteristics over time.

The lengths of time over which the satellite signal reception characteristics are simulated may last from one day to one year or more, to take into account shifts in the Earth's axis and seasonal variations. The results of a simulation of the satellite signal reception characteristics over time, in one example, may be supplied to the display/operation unit 5 as data for the number of satellites captured over time, and presented on the display.

(4) Analysis of Area where Satellite Signals can Always be Captured

From the satellite orbital information of satellites, it is possible to calculate an open area, on the celestial sphere centered at the planned satellite antenna installation position, in which satellite signals can always be captured, in an LOS state, from at least N satellites (where N is an arbitrary integer). An example of the open area calculation procedure is indicated below.

Figure 4:
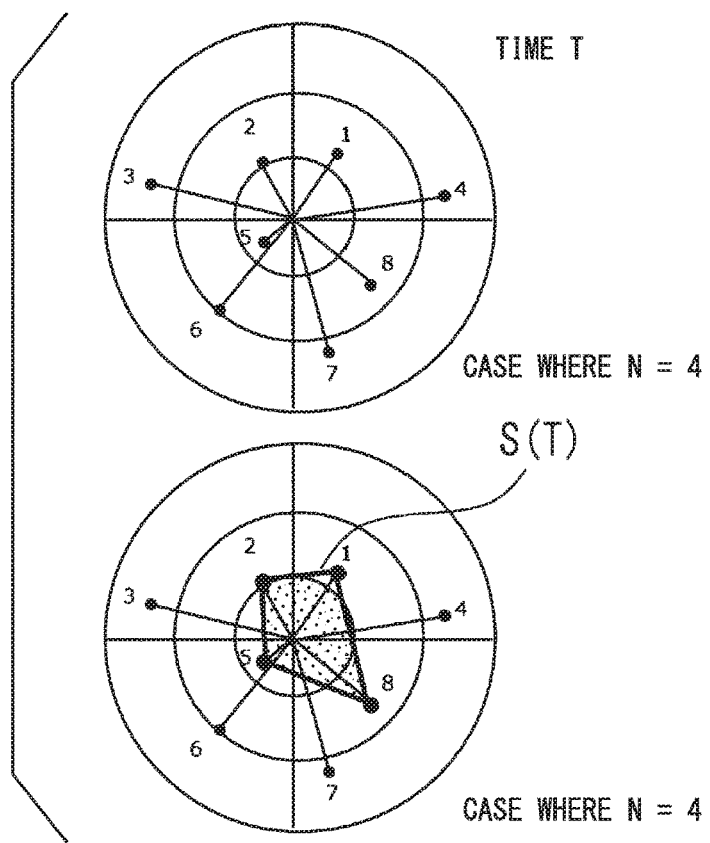
FIG. 4 is a diagram for explaining an example of a calculation procedure for an open area (projected onto a sky map) (N=4).

When N is 3 or more, N satellites are chosen, in the order of satellites with higher elevation angles, based on calculation results of the satellite orbits centered at the planned satellite antenna installation point (observation point) at a certain time T, and the N-sided polygonal region S(T) having these satellites as vertices is determined. Next, the time T is changed and the logical sum ΣS(T) of the N-sided polygonal area S(T) at the different times is determined. This logical sum is the open area. For example, as shown in FIG. 4, four satellites are chosen in the order of higher elevation angles from the calculation results for the orbits of satellites centered at the planned satellite antenna installation point (observation point) at a certain time T, a quadrilateral region S(T) having these satellites as the vertices is determined, and the logical sum ΣS(T) of the quadrilateral regions S(T) at different times when changing the time T becomes the open area. In the example in FIG. 4, the four satellites no. 1, no. 2, no. 5, and no. 8 are chosen at the time T, and the quadrilateral area S(T) having these satellites as the vertices is determined.

Figure 5:
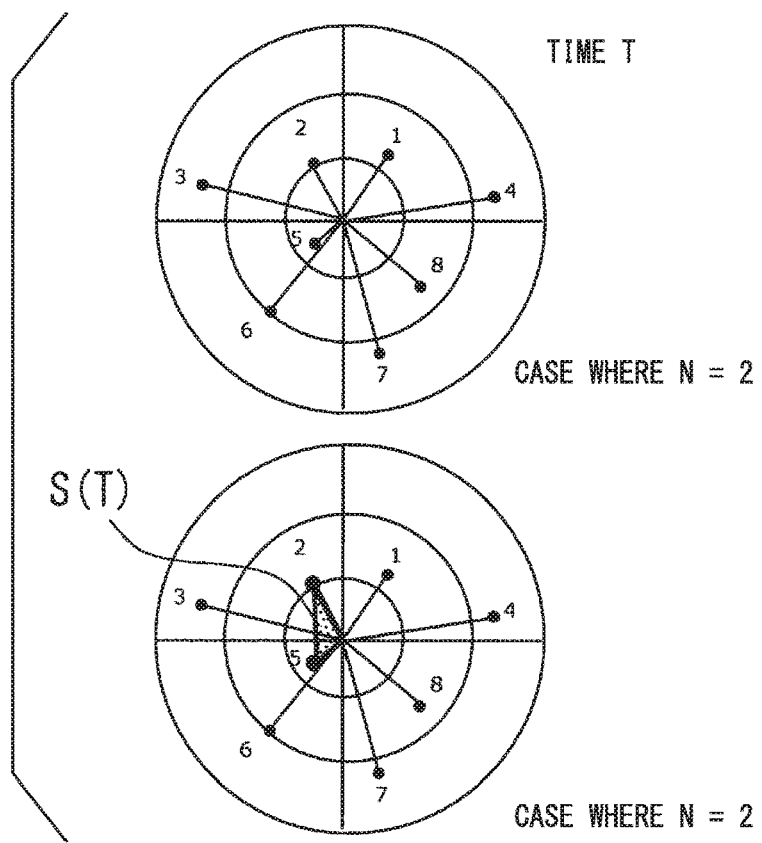
FIG. 5 is a diagram for explaining an example of a calculation procedure for an open area (projected onto a sky map) (N=2).

When N is 2, two satellites are similarly chosen in the order of higher elevation angles at a certain time T, and a triangular area S(T) including the zenith is determined. Next, the time T is changed, and the open area is calculated as the logical sum ΣS(T) of the triangular area S(T) at different times T. In the example in FIG. 5, at the time T, the two satellites no. 2 and no. 5 are chosen, and the triangular area S(T) having these satellites and the zenith as the vertices is determined.

When N is 1, the satellite having the highest elevation angle at a certain time T is chosen, and a straight line connecting the zenith with the satellite is drawn. Next, the time T is changed, the area swept by the straight line is calculated, and this swept area is determined as the open area.

The above-mentioned open area calculation examples involve choosing the satellites having the highest elevation angles for the purpose of deriving the smallest open area in which the satellite signals from N satellites can be captured in an LOS state. As an alternative, it is possible to contemplate cases of choosing combinations of satellites minimizing the TDOP (Time Dilution of Precision), which is time error information, or the PDOP value, which is positional error information, from satellites that can be captured in an LOS state. In this case, the open area can be calculated using the same procedure as that described above.

As the conditions for the times T when calculating the open area, they may be set to occur in a certain continuous period of time from the current time, or may be set under the condition that N or more satellites may be captured for a certain continuous period of time during a single day, or under the condition of the proportion of time during which N or more satellites can be captured during a single day. Additionally, the open area may be set so as to include an area calculated by the above-mentioned procedure.

These open area calculation results may be overlaid onto image information captured by the omnidirectional-imaging camera unit 2 by means of Augmented Reality (AR). At this time, the orbits and current positions of satellites on the celestial sphere may also be overlaid onto the image information. The overlay procedure may be performed by the simulation server unit 4, or by the display/operation unit 5.

The data obtained by these processes can be supplied to the display/operation unit 5 and outputted to the display, thereby allowing a worker to perform satellite antenna installation work while checking the area that needs to be opened on the celestial sphere together with the image of the peripheral environment of the planned satellite antenna installation position. Thus, the optimal satellite antenna position can be easily determined.

Figure 6A:
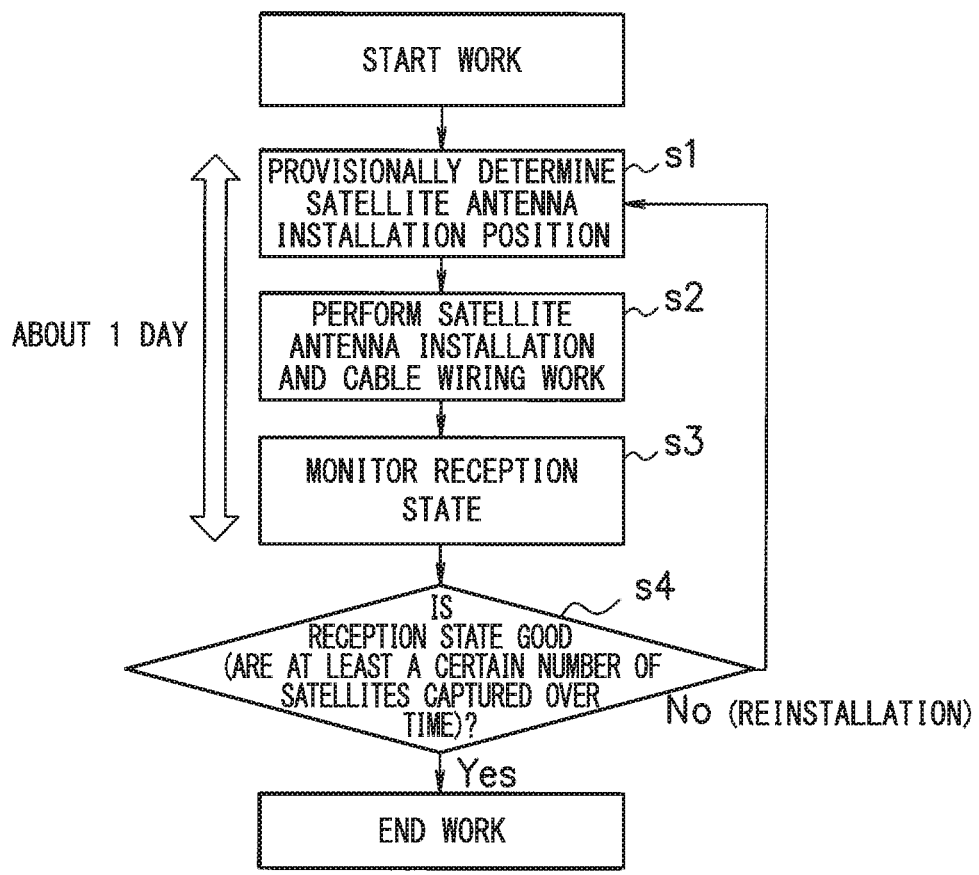
FIG. 6A is a flow chart for satellite antenna installation work according to the conventional art.
Figure 6B:
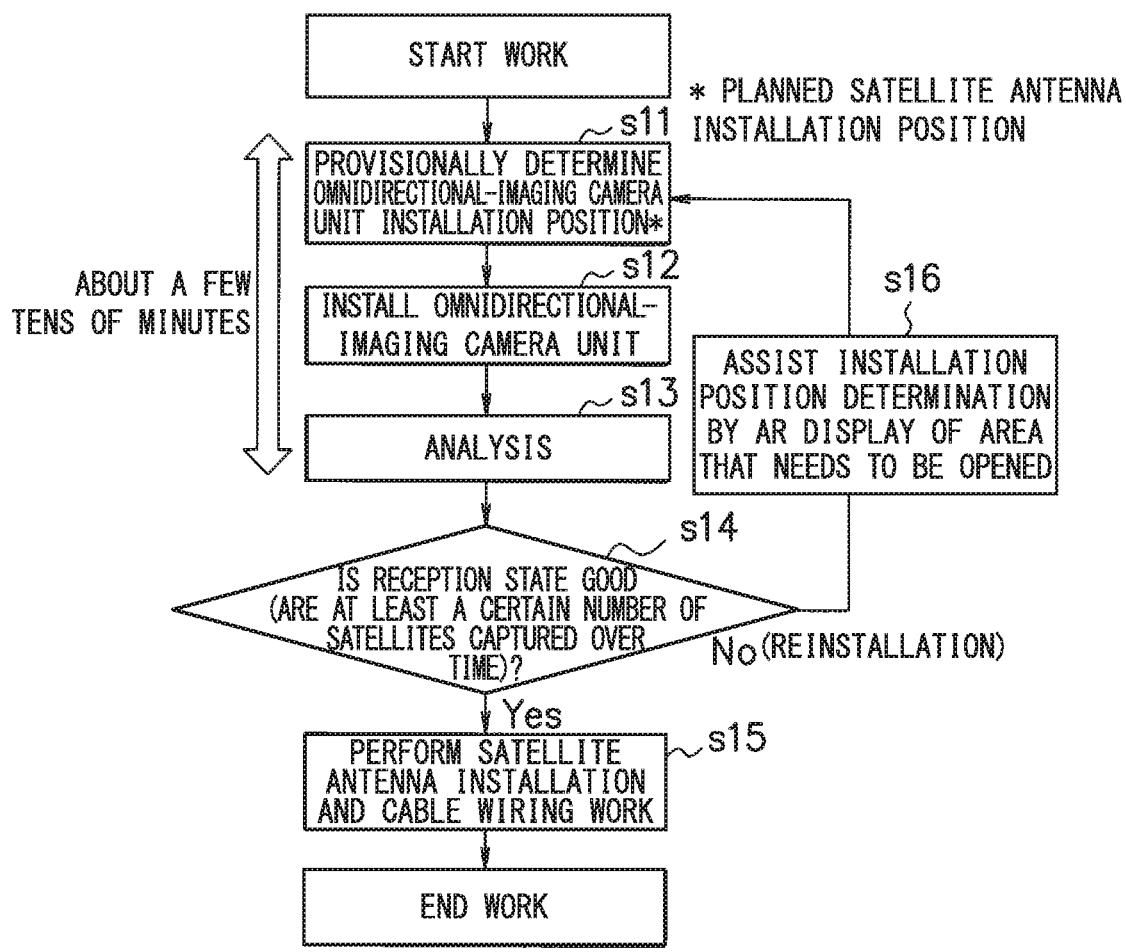
FIG. 6B is a flow chart for satellite antenna installation work according to an embodiment of the present invention.

Next, the procedure for satellite antenna installation work by a conventional method and the procedure for satellite antenna installation work when applying a scheme according to an embodiment of the present invention will be compared by referring to FIG. 6A and FIG. 6B.

In the satellite antenna installation procedure according to the conventional method, the installation position of the satellite antenna is first provisionally determined (s1), then the actual satellite antenna installation and cable wiring work are performed (s2). Next, for a certain period of time, the satellite signal reception characteristics are monitored (s3), and if it is confirmed that the required number of satellite signals can always be captured (s4: Yes), the work is completed.

If the number of satellite signals that are captured becomes lower than the necessary number, even temporarily (s4: No), then it is necessary to redo the work for determining the satellite antenna installation position, and the procedure returns to the satellite antenna installation position provisional determination step. Although the time over which the satellite signal reception characteristics are monitored depends on the period by which the satellite orbits the Earth, the period is approximately 12 hours in the case of GPS, so it is standard to monitor the reception characteristics for approximately 1 day.

For this reason, at least one day's time is usually required between the provisional determination of the satellite antenna installation position and the completion of monitoring of the reception characteristics. In addition thereto, the satellite antenna installation procedure using the conventional method is basically a procedure that is based on trial and error, and low work efficiency is a problem.

In contrast, with the satellite antenna installation procedure according to an embodiment of the present invention, the installation position of the omnidirectional-imaging camera unit 2 is provisionally determined (s11) and the omnidirectional-imaging camera unit 2 is installed (s12), then the satellite signal reception characteristics over time are analyzed using image information for the peripheral environment captured by the omnidirectional-imaging camera unit 2 (s13). If the number of satellite signals that are captured over time is the necessary number or more (s14: Yes), a satellite antenna is installed at the installation position of the omnidirectional-imaging camera unit 2, and cable wiring work is performed to complete the work (s15).

The number of satellite signals that are captured over time can be instantly analyzed using the peripheral environment image information. If the number of satellite signals captured over time is less than the necessary number (s14: No), then the procedure returns to the provisional determination of the installation position of the omnidirectional-imaging camera unit 2. At this time, the appropriate satellite antenna installation position can be easily identified by overlaying the area that needs to be opened for receiving satellite signals, the orbits and positions of satellites, or both the area that needs to be opened and the orbits and positions of satellites, by means of AR, onto the peripheral environment image information displayed on the display/operation unit 5 (s16).

Since the steps from the provisional determination of the installation position of the omnidirectional-imaging camera unit 2 to the completion of the analysis do not involve cable wiring work or reception characteristic monitoring work, it is possible to significantly reduce the work time required for antenna positioning when compared with the satellite antenna installation procedure using the conventional method, and the work can be expected to be completed in a few tens of minutes.

As mentioned above, when comparing the conventional method with the method according to an embodiment of the present invention, it can be understood that the method according to the embodiment of the present invention can significantly improve the efficiency of the satellite antenna installation work.

Due to the above functions, in an embodiment of the present invention, the satellite signal reception characteristics can be estimated in a short time and the satellite antenna installation position can be determined in a short time using a simple procedure, so it is possible to achieve improved efficiency of the satellite antenna installation work. Additionally, in an embodiment of the present invention, it is possible to solve the problem of the difficulty of estimating (simulating) satellite signal reception characteristics that accurately account for the peripheral environment using the conventional art, and the problem of the possibility that erroneous results will be generated due to inconsistencies with the actual environment when 3D map data are not updated in real time.

Additionally, in an embodiment of the present invention, the installation work is made even more efficient by further implementing the following features.

By simulating the satellite signal reception characteristics based on spatial information obtained from 3D laser measurements or 3D image information of the peripheral environment of the planned satellite antenna installation position captured by a 3D camera in the omnidirectional-imaging camera unit 2, it is possible to estimate the satellite signal reception characteristics when changing the satellite antenna installation position, and the satellite antenna installation work can be made more efficient by showing recommended positions for installation of the satellite antenna.

Using spatial information obtained from 3D laser measurements or 3D image information of the peripheral environment of the planned satellite antenna installation position captured by a 3D camera in the omnidirectional-imaging camera unit 2, multipath caused by structures in the periphery of the satellite antenna can be estimated, and its influence on the satellite signal reception characteristics can be simulated to achieve an even higher level of optimization of satellite antenna installation. In particular, the reception characteristics of satellite signals at positions having low elevation angles tend to be susceptible to the influence of multipath.

The precision of the optimization of satellite antenna installation can be improved by accounting for the error in the positional information and the orientation and inclination information of the omnidirectional-imaging camera unit 2 in the error in the satellite signal reception characteristic analysis results. Specifically, the satellite antenna installation position can be optimized by taking into consideration the influence of the error in the positional information and/or the orientation and inclination by accounting for the error in the positional information and/or the orientation and inclination in the error in the time domain for the simulation data regarding the number of satellites captured over time and/or the error in the positions and orbits of satellites in satellite orbit simulation results and in the area that needs to be opened in the celestial sphere centered at the planned satellite antenna installation position.

At the satellite antenna installation location, there can be expected to be changes in the peripheral environment over time, due to disasters, the growth of trees or human activity. In that case, by installing the omnidirectional-imaging camera unit 2 near the satellite antenna and continuously monitoring the peripheral environment at the antenna installation position during the operation of the satellite antenna, even if there is a change in the peripheral environment, it is possible to instantly analyze the influence that the environmental change has on the satellite signal reception characteristics, so that the necessary measures can be taken. Due to such continuous monitoring of the peripheral environment at the antenna installation position during operation, advantageous effects such as improved maintenance and operation properties and reliability of the system can be expected.

It goes without saying that similar advantageous effects can be obtained even if the physical arrangement of the functions of the units and/or the locations in which the functions are provided differ from those of the units constituting the satellite signal reception characteristic estimation apparatus 100 according to the embodiment of the present invention shown in FIG. 1. For example, it is possible to contemplate cases in which all of the functions are housed in a single apparatus, or some of the functions (excluding the omnidirectional-imaging camera unit) are installed at a location different from the installation location, and data are transmitted and received over a WAN. Additionally, it is possible to contemplate placing the simulation server unit 4 on the cloud. FIG. 7 to FIG. 13 show Examples 1 to 7, which are such variations in the functional arrangement.

Figure 7:
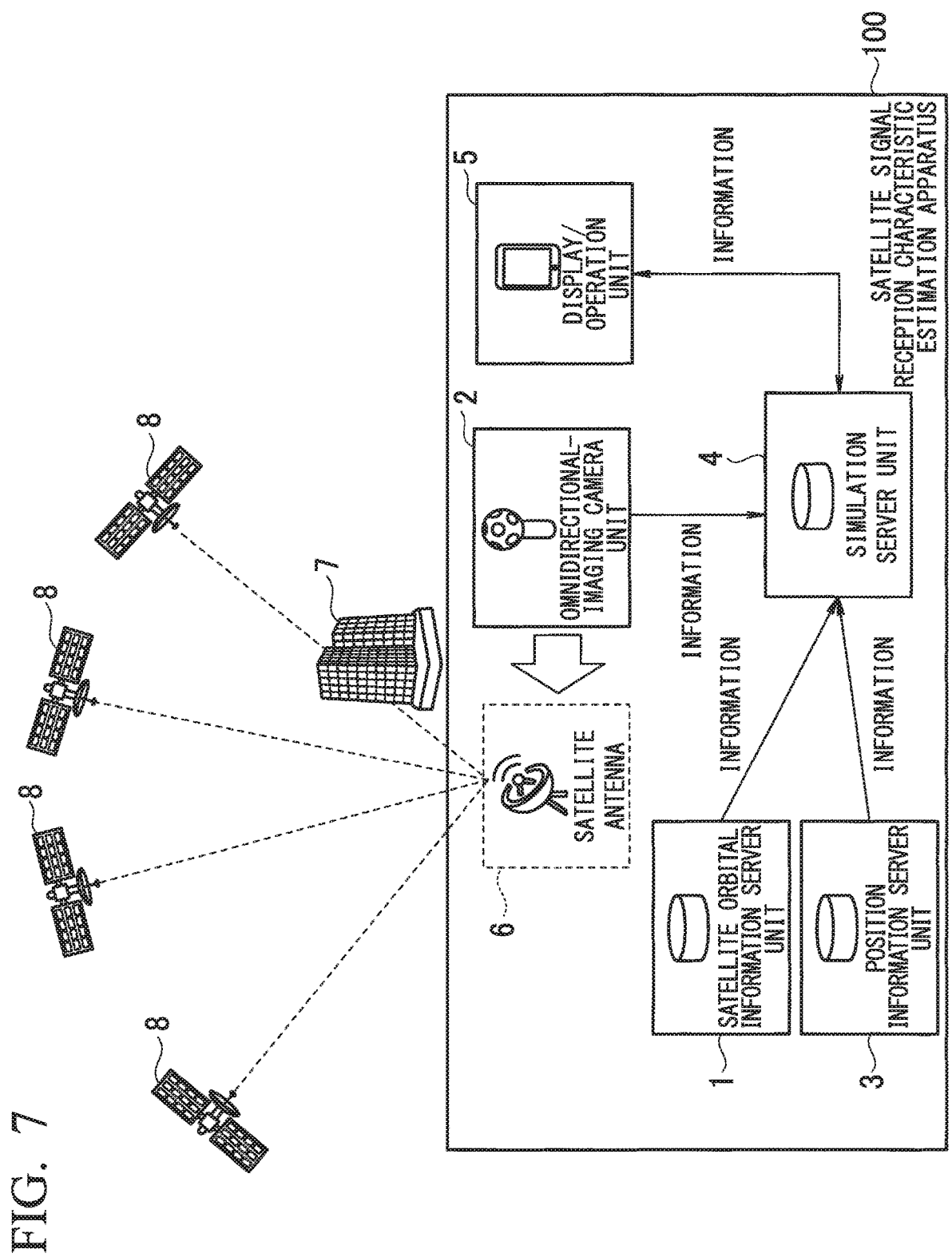
FIG. 7 is a schematic diagram of a system including a satellite signal reception characteristic estimation apparatus according to Example 1 of the present invention.
Figure 8:
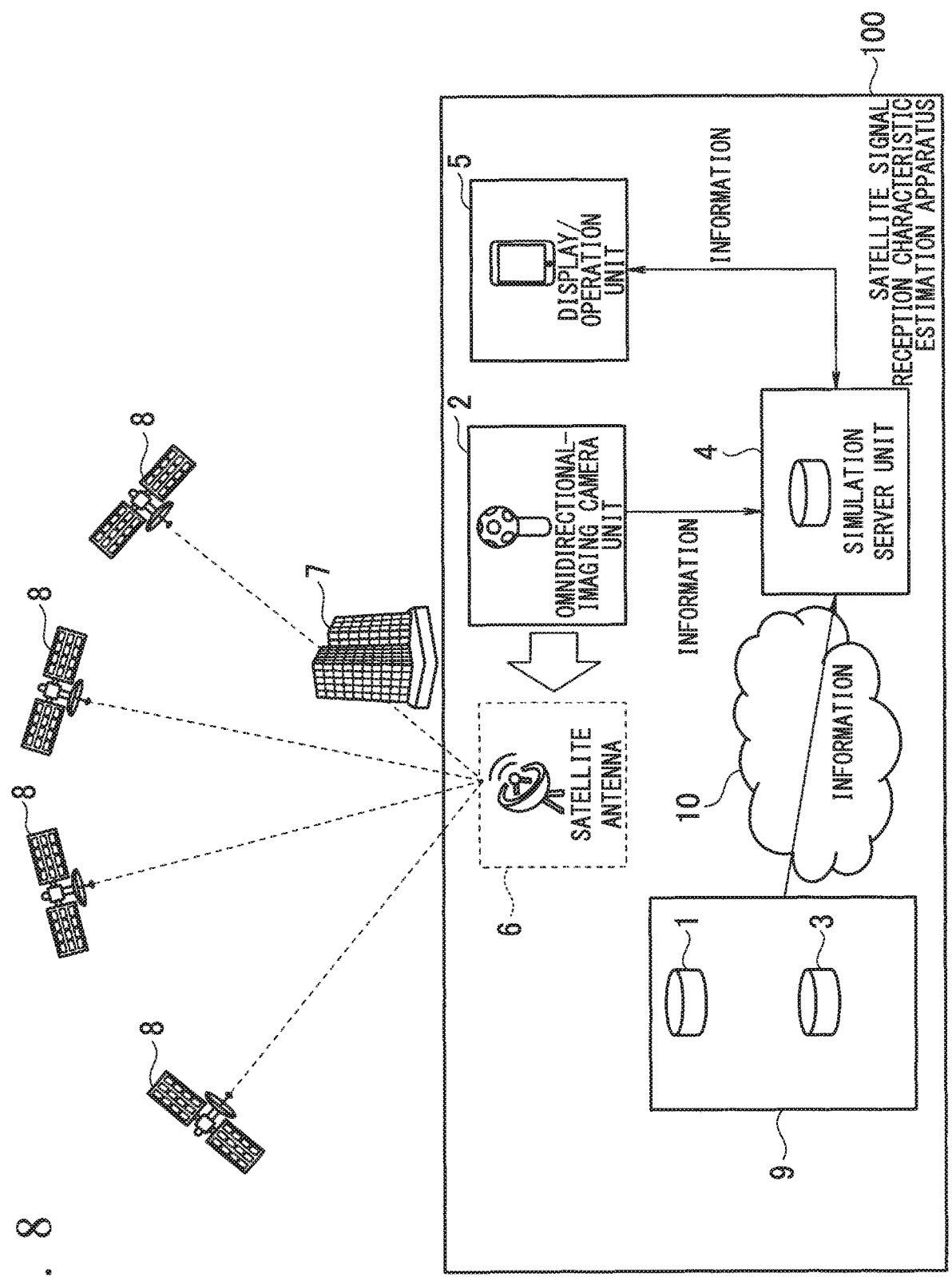
FIG. 8 is a schematic diagram of a system including a satellite signal reception characteristic estimation apparatus according to Example 2 of the present invention.

In other words, FIG. 7 shows Example 1, wherein each of the functions of the satellite signal reception characteristic estimation apparatus 100 are separately provided. In FIG. 7, reference sign 6 represents a satellite antenna, reference sign 7 represents a satellite signal obstacle and reference sign 8 represents satellites. Additionally, FIG. 8 shows Example 2, wherein the satellite orbital information server unit 1 and the positional information server unit 3 are installed in a data center 9, and are connected to the simulation server unit 4 via a WAN 10.

Figure 9:
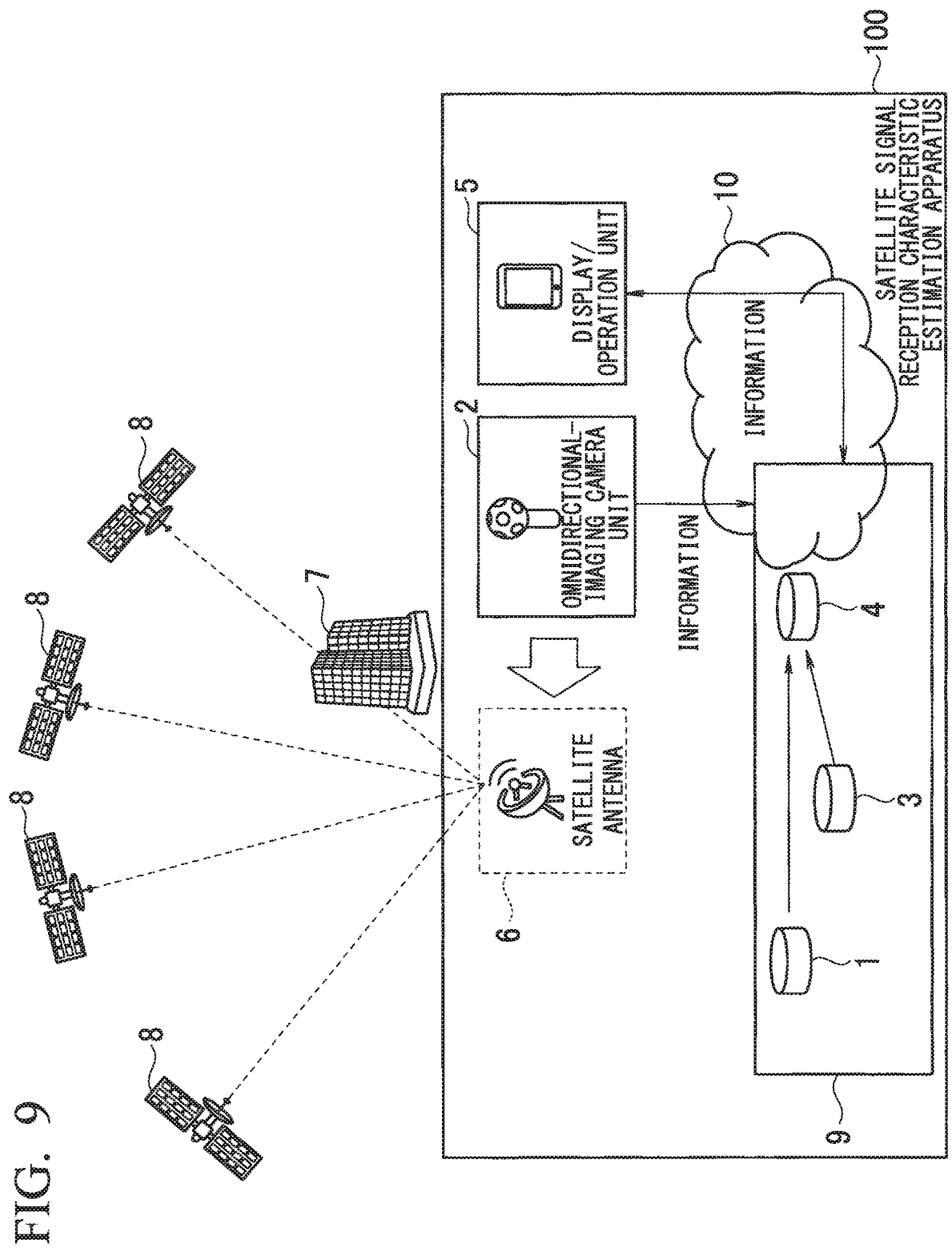
FIG. 9 is a schematic diagram of a system including a satellite signal reception characteristic estimation apparatus according to Example 3 of the present invention.
Figure 10:
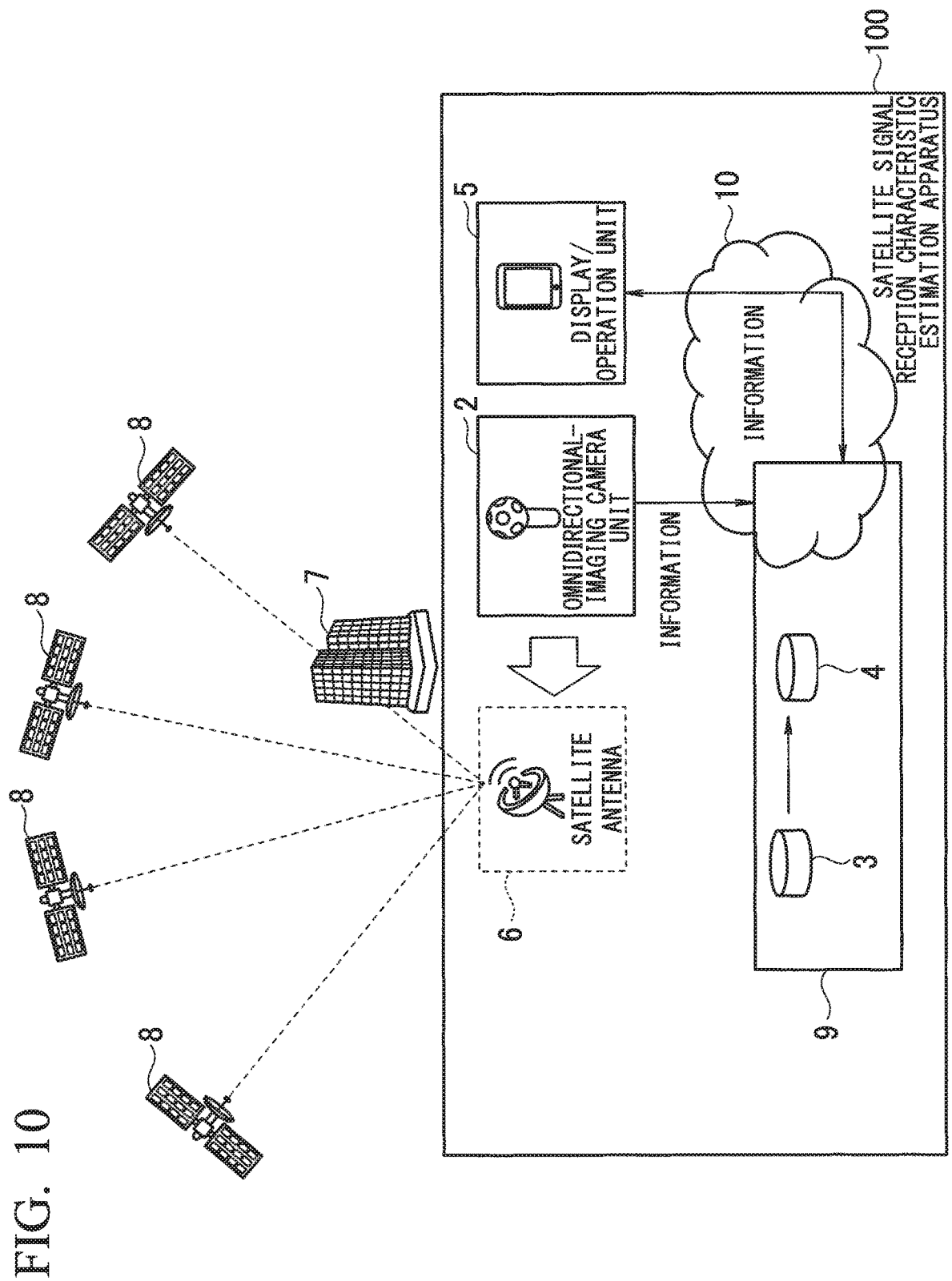
FIG. 10 is a schematic diagram of a system including a satellite signal reception characteristic estimation apparatus according to Example 4 of the present invention.

Additionally, FIG. 9 shows Example 3, wherein the satellite orbital information server unit 1, the positional information server unit 3, and the simulation server unit 4 are installed in a data center 9, and the simulation server unit 4, the omnidirectional-imaging camera unit 2, and display/operation unit 5 are connected via a WAN 10. Additionally, FIG. 10 shows Example 4, wherein the satellite orbital information server unit 1 is omitted from Example 3 by having the satellite orbital information already inputted into the simulation server unit 4.

Figure 11:
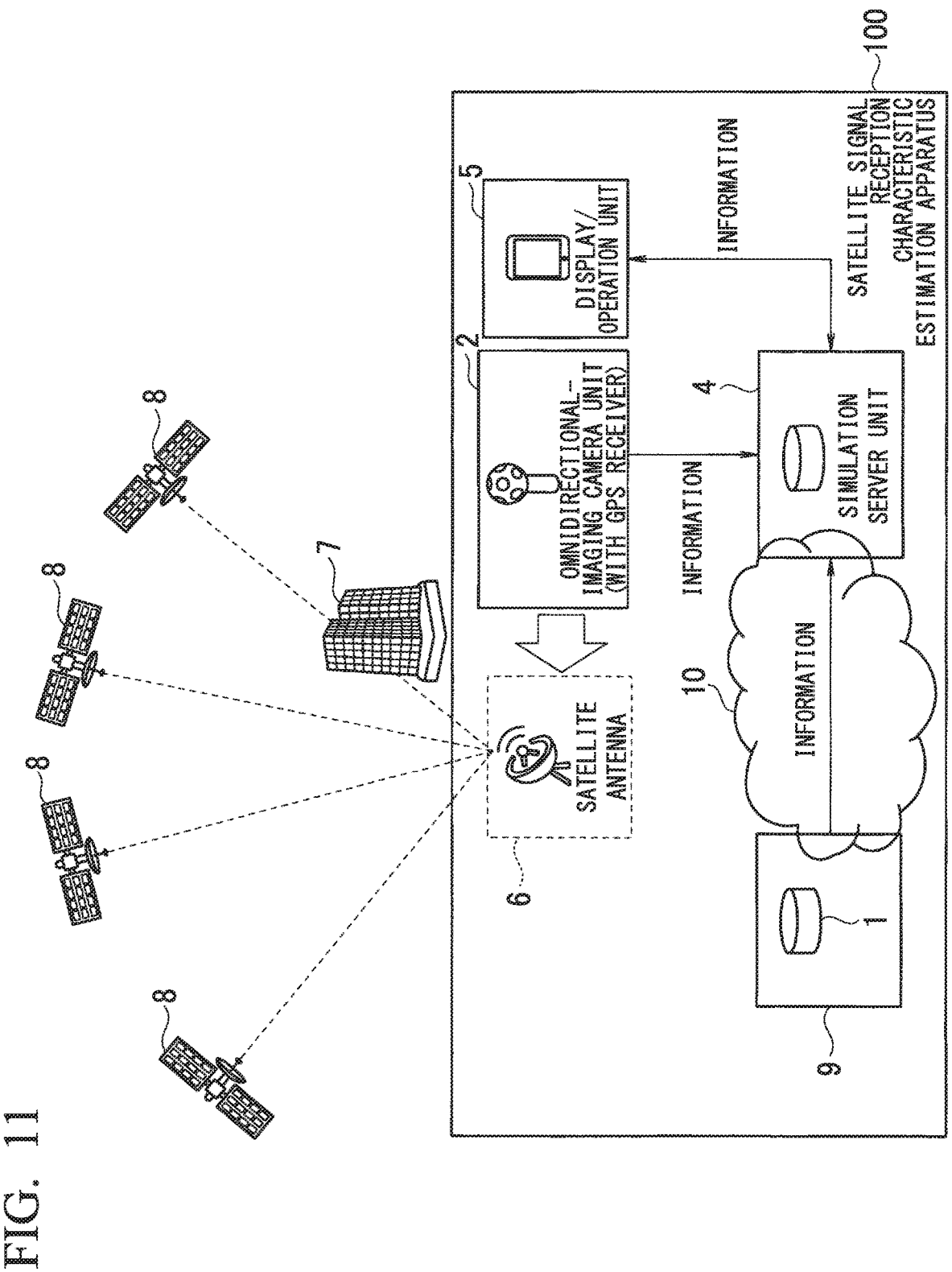
FIG. 11 is a schematic diagram of a system including a satellite signal reception characteristic estimation apparatus according to Example 5 of the present invention.
Figure 12:
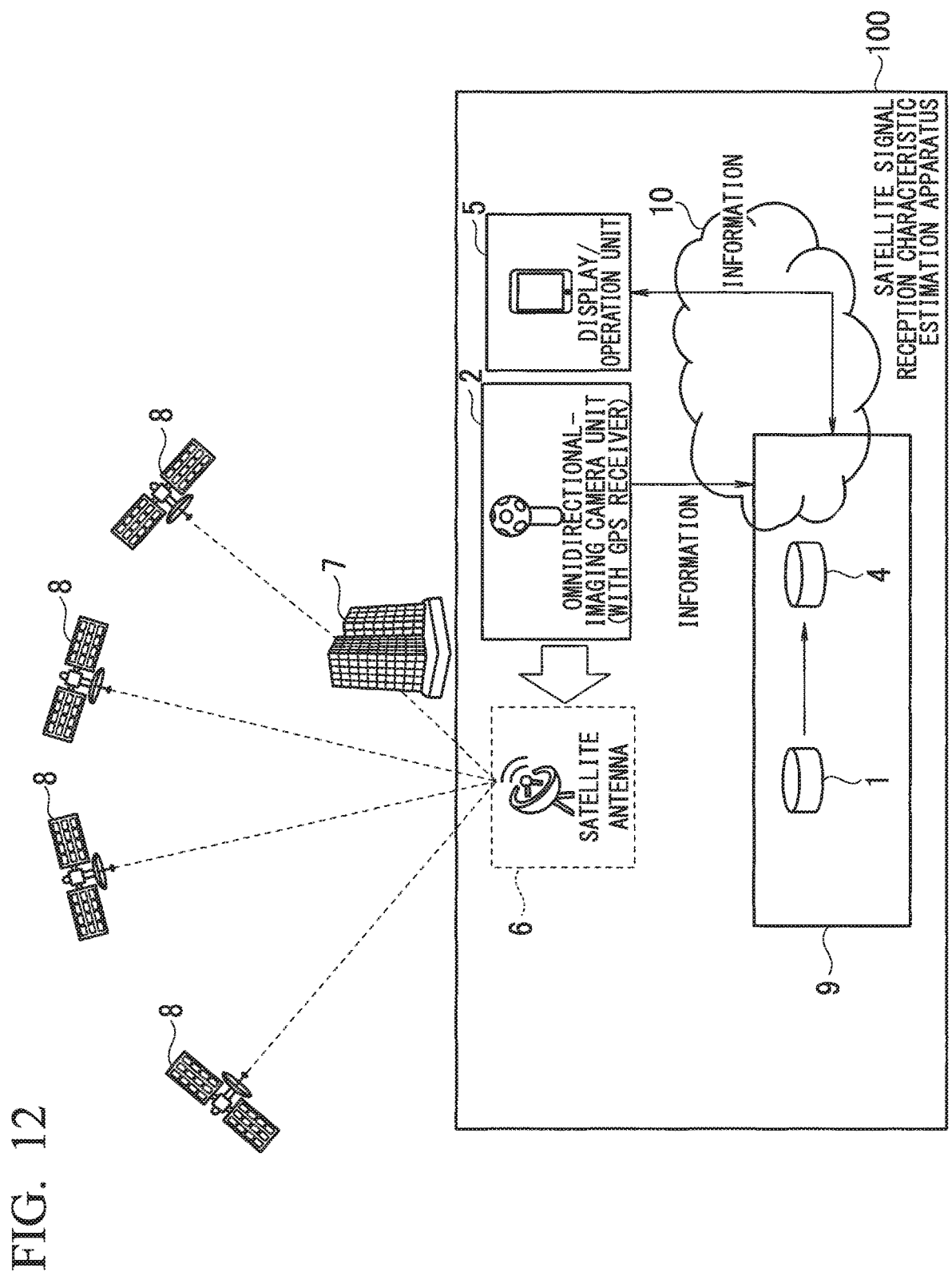
FIG. 12 is a schematic diagram of a system including a satellite signal reception characteristic estimation apparatus according to Example 6 of the present invention.
Figure 13:
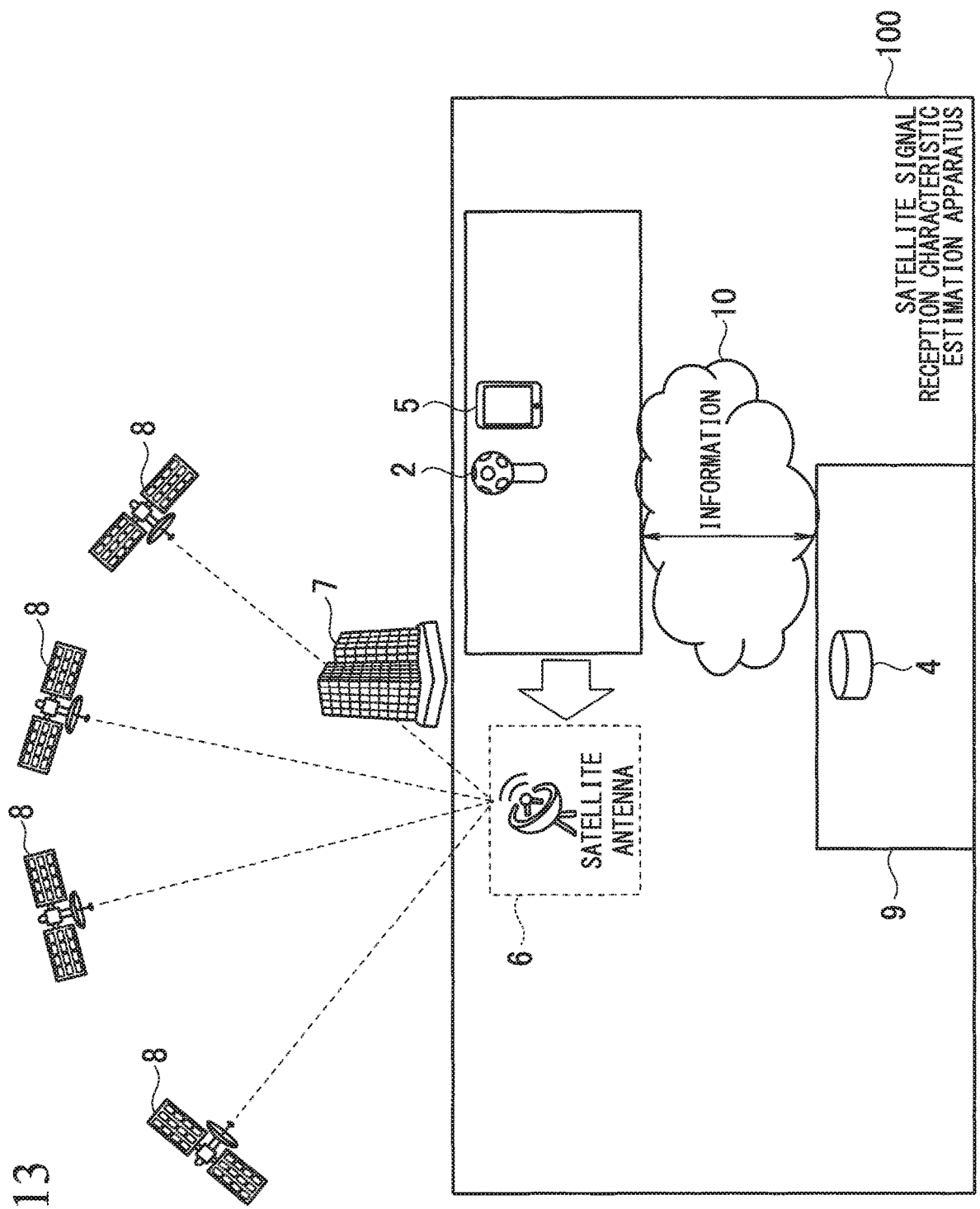
FIG. 13 is a schematic diagram of a system including a satellite signal reception characteristic estimation apparatus according to Example 7 of the present invention.

Additionally, FIG. 11 shows Example 5, wherein the positional information server unit 3 is omitted from Example 2 by mounting a GPS receiver on the omnidirectional-imaging camera unit 2. Additionally, FIG. 12 shows Example 6, wherein the positional information server unit 3 is omitted from Example 3 by mounting a GPS receiver on the omnidirectional-imaging camera unit 2. Additionally, FIG. 13 shows Example 7, wherein the satellite orbital information server unit 1 is omitted from Example 6 by having the satellite orbital information already inputted into the simulation server unit 4, and integrating the omnidirectional-imaging camera unit 2 (with GPS receiver) and the display/operation unit 5. Various other options are also possible.

Additionally, it is possible to calculate orbital information for satellites on the celestial sphere and data on the area that needs to be opened in order to receive satellite signals at a plurality of satellite antenna installation positions in the simulation server unit 4 beforehand, and to read the data, stored in a database, by operating the display/operation unit 5 as needed.

Aside therefrom, there is a method of obtaining satellite orbital data corresponding to the positional information from an assisted GPS (A-GPS) server.

While embodiments and examples of the present invention have been explained above with reference to the drawings, it should be clear that the above-described embodiments and examples are merely exemplifications of the present invention, and that the present invention is not to be construed as being limited to the above-described embodiments and examples. Thus, elements may be added, removed, substituted, or otherwise modified within a range not departing from the technical scope of the present invention.

The above-mentioned satellite signal reception characteristic estimation apparatus 100 may be implemented by using a computer. In that case, a program for implementing the functions thereof may be recorded onto a computer-readable recording medium, and the program may be read into and executed by a computer system. In this case, "computer system" includes an OS (Operating System) and hardware such as peripheral devices.

Additionally, "computer-readable recording medium" refers to portable media such as flexible disks, magneto-optic disks, ROMs (Read-Only Memory), and CD (Compact Disc)-ROMs, or memory apparatus such as hard disks that are internal to the computer system. Furthermore, "computer-readable recording medium" also includes media that only hold the program dynamically, for a short period of time, such as communication cables when the program is transmitted over a network such as the internet or over communication lines such as telephone lines, and media that hold the program for a certain period of time, such as volatile memories (RAM, Random Access Memory) inside computer systems such as servers or clients in the above-mentioned cases.

Additionally, the above-mentioned program may be transmitted from a computer system that stores the program in a memory apparatus or the like, to another computer system, via a transmission medium or by transmission waves in a transmission medium. In this case, the "transmission medium" that transmits the program refers to media having the function of transmitting information, including networks (communication networks) such as the internet or communication lines (communication cables) such as telephone lines.

Additionally, the above-mentioned program may be for implementing just some of the aforementioned functions. Furthermore, the above-mentioned program may be implemented by combining the aforementioned functions with a program that is already recorded in the computer system, such as a so-called difference file (difference program). Alternatively, the above-mentioned satellite signal reception characteristic estimation apparatus 100 may be implemented by using hardware such as a PLD (Programmable Logic Device) or an FPGA (Field Programmable Gate Array).

INDUSTRIAL APPLICABILITY

The technology for estimating reception characteristics from environmental information for the periphery of a satellite antenna according to the present invention can be used not only in satellite antenna installation work, but also in various applications that make use of satellite signals.

DESCRIPTION OF REFERENCE SIGNS

1 Satellite orbital information server unit (satellite orbital information collection unit)
2 Omnidirectional-imaging camera unit (peripheral environment spatial information collection unit)
3 Positional information server unit (positional information collection unit)
4 Simulation server unit (simulation unit)
5 Display/operation unit
6 Satellite antenna
7 Obstacle to satellite signal
8 Satellite
9 Data center
10 WAN
100 Satellite signal reception characteristic estimation apparatus

The invention claimed is:

1. A satellite signal reception characteristic estimation apparatus for estimating reception characteristics of satellite signals from a satellite in order to install a satellite antenna at an optimal position, the satellite signal reception characteristic estimation apparatus comprising:
a satellite orbital information collection unit that collects and outputs orbital information for the satellite, the orbital information being information relating to satellite orbits;
a peripheral environment spatial information collection unit that collects and outputs spatial information for a peripheral environment of an installation position of the satellite antenna, the spatial information being image information of the peripheral environment of the installation position of the satellite antenna;
a positional information collection unit that collects and outputs positional information for the installation position of the satellite antenna, the positional information being three-dimensional coordinate information that indicates the installation position of the satellite antenna; and
a simulation unit that estimates the reception characteristics of the satellite signals at the installation position of the satellite antenna by performing a simulation based on the orbital information, the spatial information, and the positional information outputted from the satellite orbital information collection unit, the peripheral environment spatial information collection unit, and the positional information collection unit, wherein calculations and analyses performed by the simulation unit in order to estimate the reception characteristics of the satellite signals at the installation position of the satellite antenna comprise (1) calculation of the satellite orbits on a celestial sphere, (2) identification of structures in the peripheral environment, (3) analysis of the reception characteristics of the satellite signals over time, and (4) analysis of an open area on the celestial sphere in which the satellite signals can always be captured.

2. The satellite signal reception characteristic estimation apparatus according to claim 1, wherein the spatial information collected by the peripheral environment spatial information collection unit is omnidirectional image information captured by a camera installed at the installation position.

3. The satellite signal reception characteristic estimation apparatus according to claim 1, wherein the analysis of the open area on the celestial sphere in which the satellite signals can always be captured, performed by the simulation unit, comprises selecting N (where N is an arbitrary integer) satellites, in the order of satellites with higher elevation angles, from among satellites that are in a (Line of Sight, LOS) state of being directly visible from the installation position of the satellite antenna, based on the satellite orbits obtained by the calculation of satellite orbits on the celestial sphere and identification results obtained by the identification of structures in the peripheral environment, and calculating an area that needs to be opened in order to receive the satellite signals, based on the positions of the selected satellites.

4. The satellite signal reception characteristic estimation apparatus according to claim 1, wherein the analysis of the open area on the celestial sphere in which the satellite signals can always be captured, performed by the simulation unit, comprises selecting a combination of satellites that are in a (Line of Sight, LOS) state of being directly visible from the installation position of the satellite antenna, for which positional error information values or time error information values for the satellites are minimized, based on the satellite orbits obtained by the calculation of satellite orbits on the celestial sphere and identification results obtained by the identification of structures in the peripheral environment, and calculating an area that needs to be opened in order to receive the satellite signals, based on the positions of the selected satellites.

5. A satellite signal reception characteristic estimation method for estimating reception characteristics of satellite signals from a satellite in order to install a satellite antenna at an optimal position, the satellite signal reception characteristic estimation method comprising:
a first step of collecting an installation position of the satellite antenna;
a second step of collecting spatial information for a peripheral environment of the collected installation position of the satellite antenna;
a third step of performing estimation of the reception characteristics of the satellite signals at the installation position of the satellite antenna, the estimation of the reception characteristics comprising analysis of an open area on a celestial sphere in which the satellite signals can always be captured;
a fourth step of determining, from the results of the estimation of the reception characteristics, whether the number of satellite signals captured over time reaches a required number; and
a fifth step of returning to the first step if the number of satellite signals captured over time does not reach the required number.

6. The satellite signal reception characteristic estimation method according to claim 5, further comprising a sixth step of, before returning to the first step, displaying, as an overlay onto the spatial information of the peripheral environment, an area that needs to be opened in order to receive the satellite signals, orbits and positions of satellites, or both the area that needs to be opened and the orbits and positions of the satellites.

7. A program that makes a computer run the steps of the satellite signal reception characteristic estimation method according to claim 5.

* * * * *